C. N. LOVEN.
FLEXIBLE TIRE.
APPLICATION FILED NOV. 12, 1917.
1,281,608.
Patented Oct. 15, 1918.
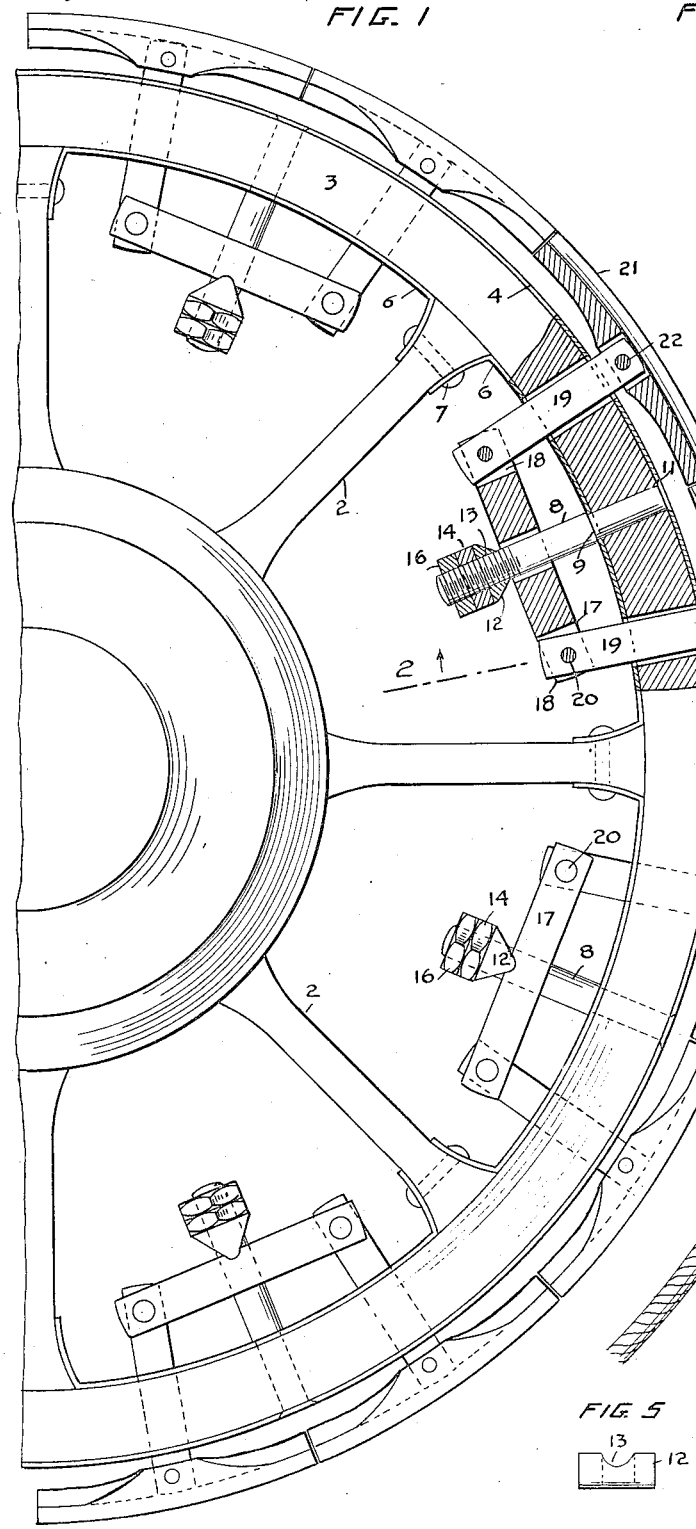
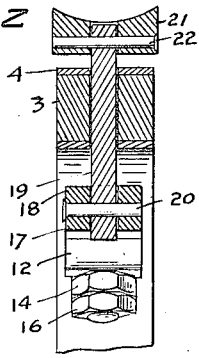
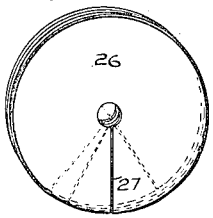
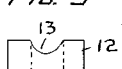
INVENTOR
CARL N. LOVEN

UNITED STATES PATENT OFFICE.

CARL N. LOVEN, OF BERKELEY, CALIFORNIA.

FLEXIBLE TIRE.

1,281,608.

Specification of Letters Patent.

Patented Oct. 15, 1918.

Application filed November 12, 1917. Serial No. 201,652.

*To all whom it may concern:*

Be it known that I, CARL N. LOVEN, a citizen of the United States, residing at Berkeley, in the county of Alameda and State of California, have invented new and useful Improvements in Flexible Tires, of which the following is a specification.

The object of the present invention is to provide a vehicle wheel tire, especially adapted for use in automobiles, which will take the place of pneumatic tires now so generally used, thereby avoiding the objections thereto and dangers attendant thereon of blow-outs, punctures, and the like, which will be very cheap and durable, which will eliminate shocks due to unevenness of the road or obstacles encountered, and will cause the vehicle to run smoothly and with comfort to the passengers.

In the accompanying drawing, Figure 1 is a broken side view of a wheel equipped with my improved tire, certain parts being broken away and others shown in vertical section; Fig. 2 is a cross section thereof on the line 2—2 of Fig. 1; Fig. 3 is an enlarged vertical section of one of the disks, of which the tire proper is composed; Fig. 4 is a perspective view illustrating the manner in which the disks are placed together to form the tire; Fig. 5 is a side view of a fulcrum.

Referring to the drawing, 1 indicates the hub, 2 the spokes, and 3 the felly of a wheel. Outside of the felly 3 is a wheel band or rim 4, and adjacent to the inner side of said felly are a plurality of metal strips 6, the ends of which are riveted, as shown at 7, to the sides of the outer terminal portions of the spokes.

Centrally between each pair of adjacent spokes there is provided a radially extending screw 8, threaded at its inner end, its outer end being reduced in diameter, and extending through registering holes in the strip 6, the felly 3 and the rim 4, a shoulder 9 on said screw abutting against the strip 6, its outer end being swaged or riveted, as shown at 11, against the rim 4. Slidable upon the threaded portion of said screw 8 is a fulcrum 12, having a central hole 13 through which the screw 8 passes, said fulcrum being held in position by a nut 14, and a lock nut 16, both screwed upon said screw. Supported at its center by said fulcrum is a lever 17 having a central hole through which the screw extends and having forked ends 18 to receive the inner ends of posts 19 pivoted to the lever by pivot pins 20. Said posts extend loosely through holes in the strip 7, felly 3, and rim 4, and their outer ends extend into holes formed centrally through tire supports or rockers 21 and are pivoted to said rockers by pivot pins 22. The inner sides of said rockers are cut away from the center of the rocker to their terminal portions so as to allow a free rocking movement of the rocker on the pivot pin 22. The outer surface of the rocker is concave transversely, as clearly shown in Fig. 2, while in a longitudinal or circumferential direction said outer surface is a part of a circle concentric with the wheel.

In said concave outer surface is contained my improved tire 23, which is composed of a ring 24 and a large number of disks 26 of cloth, paper, or other flexible material, all very firmly compressed together, each having a central hole therethrough sufficiently large to permit them to be strung upon the ring. Each disk is cut radially, as shown at 27, so as to permit the disks to be secured upon the ring. The cuts in adjacent disks extend in different directions from the ring 24, the better to retain them in place on said ring and to prevent the entry of sand or small stones into said cuts. As clearly shown in Fig. 3, the outer portion of each disk is of greater thickness than the inner portion in order to insure that said disks fit closely together throughout the whole of their adjacent surfaces.

After the ring, with the disks secured thereon and pressed firmly together, has been placed in the cavities of the rockers, it is tightened thereon by moving said rockers outwardly, which is done by screwing outwardly the nuts 14, 16, thereby pressing outwardly the fulcra 12 and the levers 17. When the tire has been sufficiently tightened upon the rockers by thus moving all the fulcra outwardly, the tire will be found to afford an extremely flexible support for the wheel, for the reason that the tire being composed of a large number of thin disks of flexible material, is itself very flexible, and the pressure on any point of the tire due to the weight of the vehicle causes the tire to yield inwardly at that point and correspondingly expand at adjacent points. Thus if the weight of the vehicle is transmitted to the rim of a wheel at a point in the center of one of the rockers, then said rocker is forced inwardly by the increased weight, causing the end of the lever to which its post is pivoted to swing inwardly on its fulcrum, so that the adjacent rocker operatively connected to the other end of the lever is forced outwardly. If the weight of the vehicle is transmitted to the tire at a point midway between two rockers, then the adjacent ends of said rockers are forced inwardly, thus forcing the other ends of the rockers outwardly. A similar effect is produced if the weight of the vehicle is transmitted to the tire at any points intermediate between the points referred to above. Thus, under all circumstances, it will be seen that the tire yields slightly at the lowest point of the wheel under the increased weight which it holds thereon, and at the same time causes the slack thus produced to be taken up by adjacent portions of the tire.

The ring 24 may be either a cable, as here shown, or a flexible band of solid metal, or other material.

The disks 26 are preferably caused to adhere together by glue, paint, or other adhesive substance interposed therebetween.

I claim:—

1. Means for yieldably supporting a tire upon a wheel, comprising devices extending radially inward from the felly of the wheel, levers supported by the several devices, posts pivotally supported at their inner ends by said levers, and tire supports pivoted to the outer ends of said posts.

2. A vehicle tire comprising a flexible ring and an annular series of disks of flexible material, each centrally apertured, the ring extending through all of said apertures, said disks fitting close together around the ring, said disks being cut radially from the central aperture to the circumference, said cuts of adjacent disks being out of register with each other.

3. Means for yieldably supporting a tire upon a wheel comprising a plurality of screws secured to the felly of the wheel and extending radially inward therefrom, a lever and a fulcrum slidably guided on each screw, a nut screwed upon each screw and serving as a support for the fulcrum, posts pivotally supported at their inner ends upon the ends of the lever, the felly having holes through which said posts extend, and tire supports, mediate portions of which are pivoted to the outer ends of said posts.

4. Means for supporting a tire upon a wheel, comprising supports for the tire, movable to and from the felly of the wheel, means for supporting said tire supports upon said felly, such that the inward movement of one tire support produces an outward movement of an adjacent tire support, and means for moving both tire supports simultaneously to and from said felly.

CARL N. LOVEN.